US009880302B2

(12) United States Patent
Wuestefeld et al.

(10) Patent No.: US 9,880,302 B2
(45) Date of Patent: Jan. 30, 2018

(54) IDENTIFYING RESERVOIR DRAINAGE PATTERNS FROM MICROSEISMIC DATA

(71) Applicant: Engineering Seismology Group Canada Inc., Kingston (CA)

(72) Inventors: Andreas Wuestefeld, Lillestrom (NO); Adam Mirza Baig, Kingston (CA); Theodore Ivan Urbancic, Inverary (CA)

(73) Assignee: Engineering Seismology Group Canada Inc., Kingston (CA)

( * ) Notice: Subject to any disclaimer, the term of this patent is extended or adjusted under 35 U.S.C. 154(b) by 1010 days.

(21) Appl. No.: 13/894,778

(22) Filed: May 15, 2013

(65) Prior Publication Data

US 2014/0200811 A1    Jul. 17, 2014

Related U.S. Application Data

(60) Provisional application No. 61/752,575, filed on Jan. 15, 2013, provisional application No. 61/783,738, filed on Mar. 14, 2013.

(51) Int. Cl.
*G01V 1/28*    (2006.01)
*E21B 49/00*    (2006.01)
*E21B 43/25*    (2006.01)

(52) U.S. Cl.
CPC ............ *G01V 1/288* (2013.01); *E21B 49/006* (2013.01); *E21B 49/008* (2013.01); *G01V 2210/1234* (2013.01); *G01V 2210/6122* (2013.01); *G01V 2210/65* (2013.01)

(58) Field of Classification Search
CPC .................................................... G01V 1/288

USPC ....................................................... 702/14, 16
See application file for complete search history.

(56) References Cited

U.S. PATENT DOCUMENTS

| 5,377,104 A * | 12/1994 | Sorrells | E21B 41/0057 702/11 |
| 5,963,508 A * | 10/1999 | Withers | G01V 1/008 166/250.1 |
| 2009/0299637 A1* | 12/2009 | Dasgupta | G01V 1/008 702/12 |
| 2010/0157730 A1* | 6/2010 | Bradford | G01V 1/30 367/38 |
| 2012/0150445 A1* | 6/2012 | Aarre | G01V 99/00 702/2 |

(Continued)

OTHER PUBLICATIONS

Odling, Permeability scaling properties of fault damage zones in siliclastic rocks, Journal of Structural Geology 26 (2004) 1727-1747.*

(Continued)

Primary Examiner — Gregory J Toatley
Assistant Examiner — Michael Dalbo
(74) Attorney, Agent, or Firm — Marshall & Melhorn, LLC

(57) ABSTRACT

A method and system for identifying reservoir drainage patterns from microseismic data for illustrating flow paths towards ports. The method includes: determining moment tensor data for each of a plurality of microseismic events in the reservoir; inferring crack formation data in the reservoir in dependence on the moment tensor data; and calculating stream lines that represent predicted flow of fluids through the reservoir in dependence on the inferred crack formation data.

20 Claims, 10 Drawing Sheets

(56) References Cited

U.S. PATENT DOCUMENTS

| | | | | |
|---|---|---|---|---|
| 2013/0100770 A1* | 4/2013 | Diller | ............ | G01V 1/288 367/38 |
| 2013/0124169 A1* | 5/2013 | Sung | ............ | E21B 43/26 703/2 |
| 2013/0146293 A1* | 6/2013 | Zazovsky | ............ | E21B 43/006 166/308.1 |
| 2013/0246023 A1* | 9/2013 | Chapman | ............ | G01V 1/30 703/2 |

OTHER PUBLICATIONS

Dahm, Comparison of Absolute and Relative Moment Tensor Solutions for the Jan. 1997 West Bohemia Earthquake Swarm, Studia geoph. et geod. 44 (2000).*

Baig, Microseismic moment tensors: A path to understanding frac growth, The Leading Edge Mar. 2010.*

What is a Moment Tensor?, ESG Solutions, (accessed on Oct. 13, 2016: https://www.esgsolutions.com/technical-resources/microseismic-knowledgebase/what-is-a-moment-tensor), pp. 1-2.*

Baig A. et al: Microseismic moment tensors: A path to understanding frac growth; The Leading Edge, Mar. 2010, v. 29 p. 9 No. 3, pp. 320-324.

Nicholson T. et al.: On entropy and clustering in earthquake hypocentre distributions; Geophysical Journal International, Jul. 2000, 142 (1), pp. 37-51.

Fisher M.K. et al.: Integrating Mapping Technologies to Optimize Simulations in Barnett Shale; Society of Petroleum Engineers, Paper 77441-MS presented at the SPE Annual Technical Conference and Exhibition, Sep. 29-Oct. 2, 2002, San Antonio, Texas, USA, SPE, New York (2002).

Urbancic T.I. et al: Investigating the extent of excavation influence using deformation state analysis; in: Rockbursts and Seismicity in Mines, S.J. Gibowicz (ed), A.A. Balkema, Rotterdam, Netherlands, 1997.

* cited by examiner

IDENTIFYING RESERVOIR DRAINAGE PATTERNS FROM MICROSEISMIC DATA

CROSS-REFERENCE TO RELATED APPLICATION

This application claims the benefit of and priority to: (1) U.S. Patent Application Ser. No. 61/752,575, filed Jan. 15, 2013, the contents of which are incorporated herein by reference; and (2) U.S. Patent Application Ser. No. 61/783,738, filed Mar. 14, 2013, the contents of which are incorporated herein by reference.

BACKGROUND

Efficient production of stimulated volumes is the ultimate goal of enhanced oil recovery (EOR) in unconventional shale gas and oil projects. Microseismic monitoring is increasingly used to provide in situ measurements of stimulation programs.

SUMMARY

According to one example aspect there is provided a method for identifying flow patterns in a reservoir from microseismic event data. The method includes: determining moment tensor data for each of a plurality of microseismic events in the reservoir; inferring crack formation data in the reservoir in dependence on the moment tensor data; and calculating stream lines that represent predicted flow of fluids through the reservoir in dependence on the inferred crack formation data.

According to another example aspect, there is provided a computerized system for identifying flow patterns in a reservoir containing hydrocarbon fluids. The system includes a dataset of microseismic event information for a plurality of microseismic events in the reservoir, the microseismic event information being dependent on measurements made by sensors in the reservoir in response to the introduction of fracturing fluids to the reservoir; a graphical output device; and a processor system. The processor system is enabled to: determine moment tensor data for each of a plurality of the microseismic events in dependence on the microseismic event information; infer crack formation data in the reservoir in dependence on the moment tensor data; calculate stream lines that represent predicted flow of fluids through the reservoir in dependence on the inferred crack formation data; and output a graphical representation of the stream lines on the graphical output device.

BRIEF DESCRIPTION OF THE DRAWINGS

Reference will now be made, by way of example, to the accompanying drawings which show example embodiments of the present description, and in which:

FIGS. 2A to 2C illustrate orientations of strain axis in a reservoir at stimulation depth inferred from more than 33000 individual SMTI results of a multi-well hydro-frac stimulation.

DETAILED DESCRIPTION

Figure 1B:
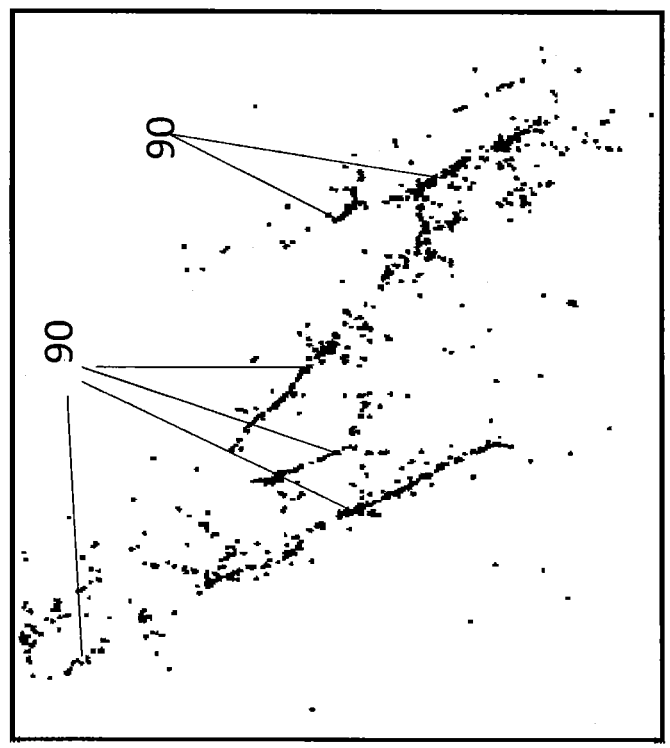
FIGS. 1A and 1B illustrate respectively an event location map before and after a collapsing algorithm is applied.

In hydraulic fracturing, microseismic event locations provide detailed information on the paths of fluids during stimulation and thus the success of the design. In real-time projects engineering parameters such as pressures can then be adopted to improve event rate and stimulated reservoir volume. The geometry of the fractured zone (length, height, width, and azimuth) then provides important constraints on the accessible hydrocarbons.

While event locations provide valuable information on the response of the rock to stimulation, they use only time domain information. Down-hole recordings can make use of the frequency content as well and thus provide directly, i.e. without calibration, source parameters such as moment magnitude and source area. These source parameters are then used to define the seismic deformation, proportional to the seismic moment per unit volume, to constrain the stimulated reservoir volume (SRV) to regions of significant seismic activity. Small and/or isolated events, which are not connected to the wellbore and thus do not contribute to production, can thus be disregarded. Using the envelope of seismic event cloud provides an optimistic SRV.

Early attempts to predict flow paths through the stimulated volume neglected vertical extent of the event cloud and connected linear features in event location maps. These lines were then interpreted as fractures and fracture networks (e.g. Fisher et al., 2002). Post-processing algorithms, such as collapsing and clustering (e.g. Nicholson et al., 2000) reduce effects of location error in such approaches and provide statistical constrains on the significance of a linear feature. The results of such processing can be applied to identify compartments and potential fluid sinks when planning a stimulation program.

Microseismic data provides insights on the efficiency of a hydrocarbon field stimulation program. Current interpretation is often limited to assessing stimulated fracture geometry and number of events. Classical flow patterns, based on symmetric and homogeneous flow, are then often assumed to predict drainage areas and production volumes.

Methods and systems are disclosed herein that relate to linking geophysical data with reservoir engineering. In particular, in situ measurements on the strain imparted on the rock mass by individual rock failures are used. Moment tensor inversion of microseismic events yields the failure mechanism and orientation of each event.

An example of a monitoring and modeling system to which the methods and systems described herein may be applied is described in U.S. patent application Ser. No. 13/507,231, published Dec. 20, 2012 as US-2012-0318500 and entitled "Methods and Systems for Monitoring and Modeling Hydraulic Fracturing of a Reservoir Field", the content of which is incorporated herein by reference.

Historically, the resultant strain field of all events has been used to map compartments of parallel strain. In the present embodiment, this approach is extended on the assumption that tensile strain on the rock mass opens preferred flow path ways. By mapping stream lines through the strain field it is thus possible to identify drainage patterns of individual ports throughout the stimulated reservoir volume.

Figure 1A:
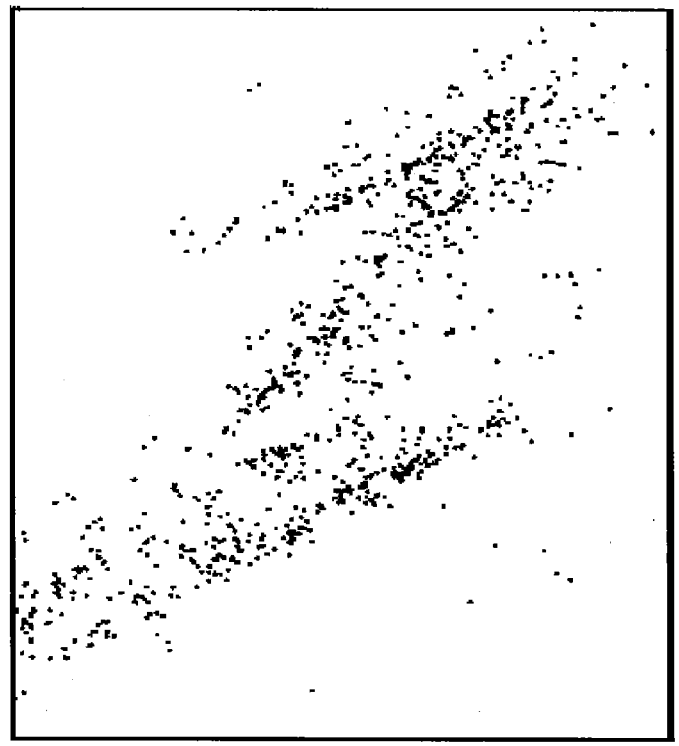

FIG. 1A shows an event location map before a collapsing algorithm is applied and FIG. 1B shows the event location map after a collapsing algorithm is applied. Faults 90 are delineated much clearer in the map of FIG. 1B, and individual events are moved within their respective error bounds to reduce the overall error.

While such an event location approach is useful for reservoir-scale mapping of the fault system, local variations of the fracture network remain unresolved. The method of Seismic Moment Tensor Inversion (SMTI; e.g. Baig and Urbancic, 2010; Patent App. Pub. US-2012-0318500) offers direct insight into the discrete fracture network stimulated by individual cracks. By including polarity and amplitude in the phase arrival information, the fracture mechanism can be resolved. Thus, tensile and shear-cracks as well as their opening and closing components can be distinguished, each of which has different implications on the generated permeability. Furthermore, the orientation of individual fracture planes can be inferred. For example, it has been shown that vertical and horizontal fractures are predominantly stimulated in different lithologies of a reservoir during a single stimulation. This information provides valuable constraint of reservoir flow models.

In the present disclosure, the seismological information of individual fracture mechanisms is used to obtain a geomechanical model of the strain imparted on the rock mass. Such a resultant strain field has been used (Urbancic et al., 1997) in mining applications to characterize local stress variation caused by excavation. In the presently describe embodiment, this approach is adapted to a hydraulic fracturing setting. The (tensile) strain direction is related to the failure direction in the rock mass, thus obtaining a dominant flow direction at each grid point. Flow is then followed through the stimulated volume towards the ports to identify the drainage pattern.

By way of illustration, application of the present concept of drainage pattern on an example dataset from the Horn River Basin in British Columbia, Canada. More than 33000 SMTI solutions of a multistage zipper frac stimulation program have been calculated. The strain field is then calculated following the nearest-neighbor method of Urbancic et al. (1997). At each grid point the average moment tensor of nearest neighbors within the grid cell is calculated from which the principal strain (P, B and T) axes are then determined. Following standard seismological convention, the P-axis corresponds to the most compressive orientation, the T-axis to the least compressive (i.e. most tensile) and the B-axis to the intermediate orientation.

Figures 2, 2A:
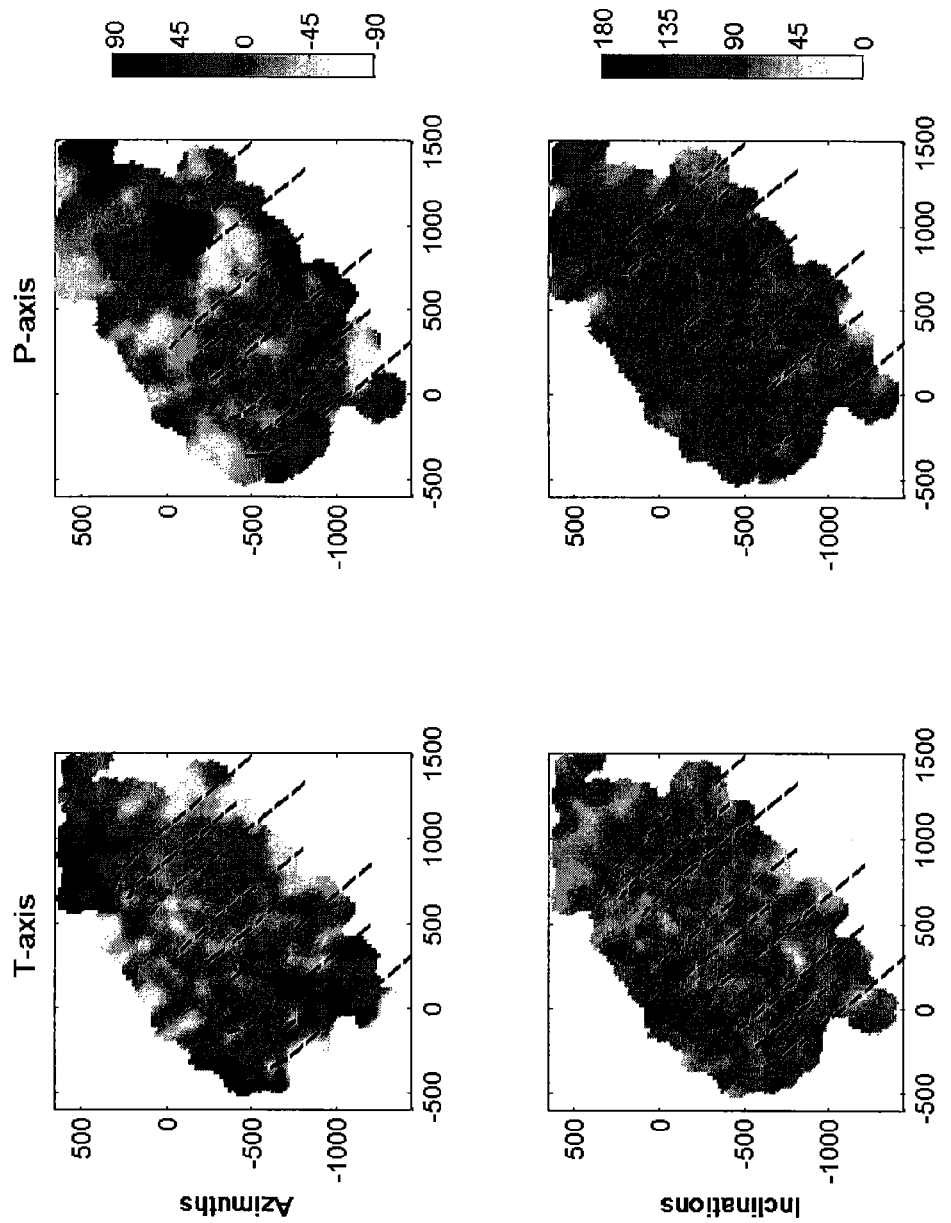

FIGS. 2(*a*) to 2(*c*) are graphical representations of a calculated strain field, showing the orientation of P and T axis orientations at main stimulation depth at the stimulated fracture zone 202 of a reservoir. The lengths of the markers 204 in FIG. 2(C) correspond to the inclination of the strain axis, with vertical inclination represented by a dot. As shown in grey scale diagrams in FIGS. 2(*a*) and 2(*b*) respectively, both T-axis and P-axis strain vary largely from the NE-SW regional stress field, with strong variations and compartmentalization on a local scale. The stage ports 200 along the different wells are shown as gray bars.

The principal strain orientations vary widely throughout the stimulated zone: In the strain maps (FIG. 2(*a*)-2(*c*)), the Eastern areas show homogeneous (parallel) orientations of the principal strain axis. Note that in these areas the P- and T axes are also approximately horizontal. Other areas, for example in the North-West show more complex variations of the strain axis. These features remain stable when tested with different gridding parameters and subsets of the data. Note also that the azimuths of P-axis are generally different from (i.e. not parallel to) the NE-SW regional stress field. This highlights the fact that assuming the regional stress field orientation in post-stimulation reservoir simulations is an oversimplification of the local strain field. Rather, complex compartmentalization of stress and strain dominates, which is probably caused by variations of lithology, elastic moduli, and/or dominant fluid flow paths caused by the discrete fracture network.

The strain field is then used to identify flow paths within the stimulated volume. The T-axis represents the orientation of most tensile strain on the rock matrix. This in turn relates to the orientation of openings. In contrast, the P-axis is related to the dominant orientation of inhibited flow. The flow can then be visualized by stream lines, with seed points at each individual stimulation port. Each line thus traces the origin areas of gas or oil reaching the port. Furthermore, areas of parallel stream lines are likely to be drained easier, whereas complex stream line patterns are to be related to complex, inhibited flow.

Figure 3:
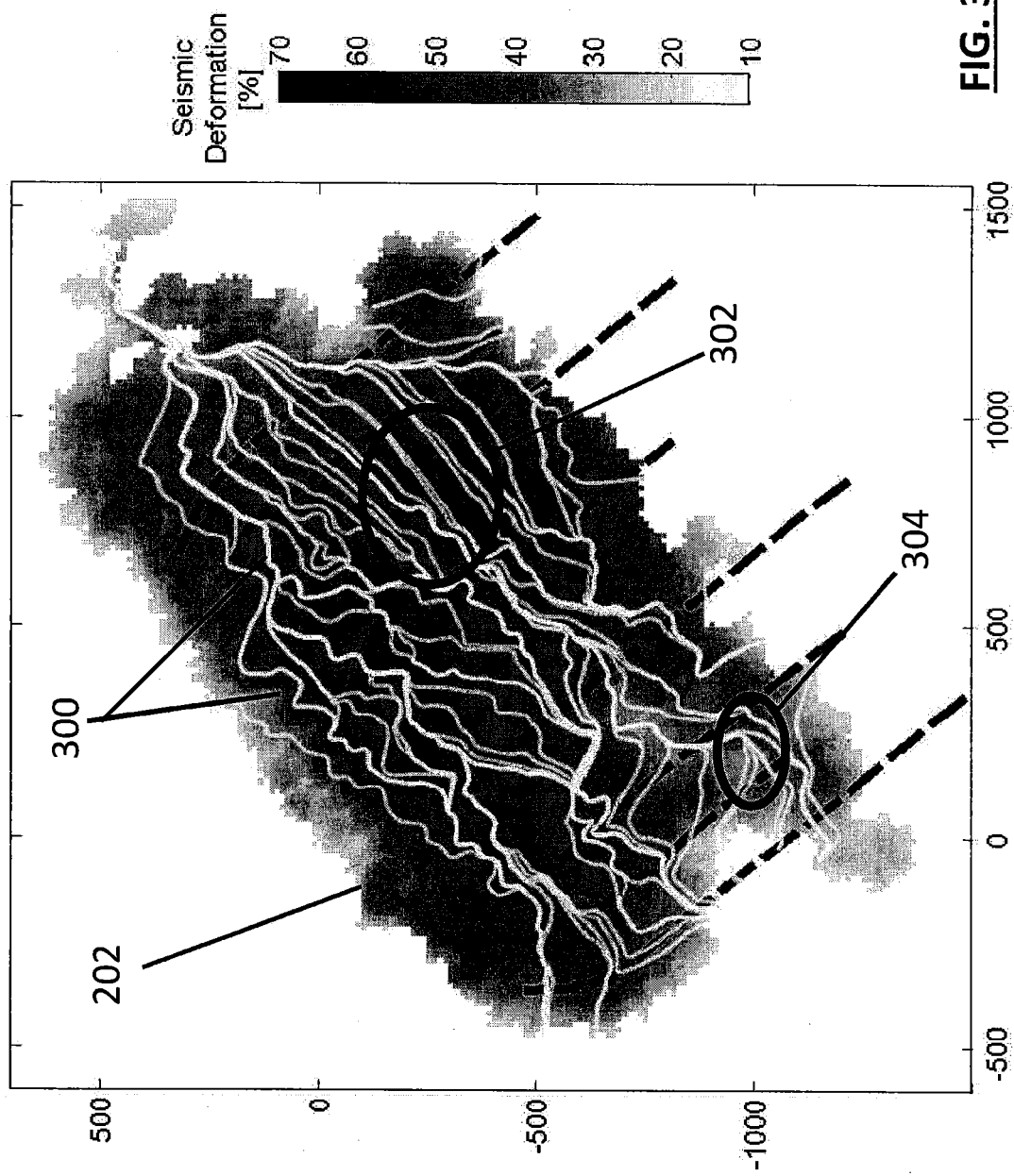
FIG. 3 shows a plot of streamlines along dominant crack opening orientation in the reservoir of FIG. 2 as inferred from the strain T-axis of SMTI solution to illustrate drainage patterns in the reservoir.

The stream lines aid in identifying the origin of the hydrocarbon flow arriving at each port, but not the strength of the expected flow. The flow maps can however be complemented with other established microseismic parameters. Similar to the estimation of Stimulated Reservoir Volume, the Seismic Deformation, which is proportional to cumulative Seismic Moment per unit volume, is used as proxy for generated free surface area. In this regard, FIG. 3 shows the resulting flow paths 300 through the reservoir fracture zone 202 underlain by the seismic deformation. Streamlines 300 along dominant crack opening orientation as inferred from the strain T-axis of SMTI solution illustrate drainage patterns in the fracture zone 202 of the reservoir. In combination with Normalized Seismic Deformation, which shows areas of strongly shattered rocks, the drainage potential can be inferred. Note the area variability of stream lines 300, which in some areas (see area 302) are markedly parallel and in other areas (see area 304) highly convoluted.

Areas 302 of high seismic deformation and parallel stream lines are very easy and fast to drain of hydrocarbons. Ports associated with convoluted stream lines and which have only access to low seismically deformed areas 304, will drain slower. This method cannot predict with certainty the actual hydrocarbons in place, but does offer unique calibration points for reservoir models and production curve analysis and reserve estimates (recoverable volumes).

Microseismic data can offer a wealth of information about the geomechanic processes involved in hydraulic fracturing. Especially, multi-array recordings facilitate going beyond simply locating events, but to also resolving individual fracture planes. Furthermore, in at least some applications the full strain field after stimulation can be inferred from in situ data. This strain field is much more complex and shows strong local variations from the regional stress direction. Thus, this disclosure presents a methodology to illustrate flow paths towards the ports. In combination with seismic deformation as proxy for strength of shattering of the rock, this method illustrates drainage patterns and drainage potential of the stimulated reservoir volume.

Figure 4:
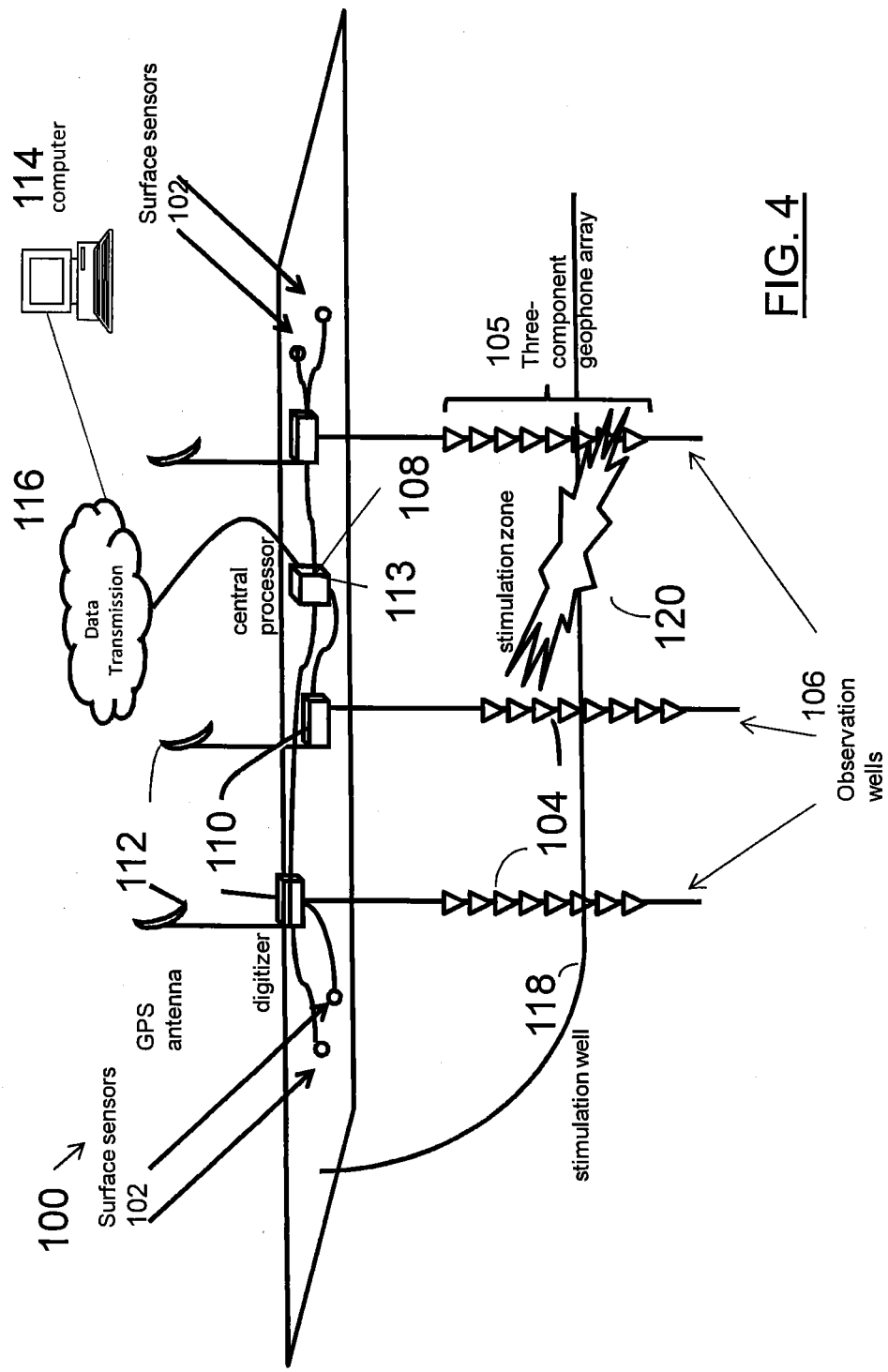
FIG. 4 is a schematic illustration of an example hydraulic fracturing monitoring system deployed to collect microseismic data caused by hydraulic fracturing from a stimulation well of a reservoir.

According to at least one example embodiment, the following actions can be performed or simulated by a data processing system on a data set to arrive at the results illustrated by FIG. 3:

1. Resolve the Seismic Moment Tensor for each event
2. The Moment Tensor gives then the direction and magnitude of displacement/strain at each event location
3. Eigen value analysis gives the principal components of strain, P-, B- and T-axes; the maximum, intermediate and least compressive strain axes, respectively
4. Gridding of the moment tensor (using nearest-neighbour or similar approaches) gives average moment tensor at each point.
5. A gridded strain field is produced from principal components of the average moment tensor at each point.
6. Geomechanic theory suggests that the cracks in the rock mass are preferentially oriented up to 45 degrees between strain P- and T-axis. This opens preferred flow path ways.
7. Flow then occurs along these cracks.
8. Stream lines are used to visualize/represent the trajectories of particles in a steady flow.
9. Stream lines are:
   a. tangent to the vector of the flow
   b. perpendicular to equipotential lines
10. In some example embodiments the direction of the strain is used (not its magnitude)—however magnitude but can be incorporated to show strength of flow
11. In some example embodiments, "seed points" for the stream lines are selected at the centres of the perforations for each stage. However, these can alternatively be arbitrary locations
12. By mapping stream lines through the crack field (as inferred from the strain field) it is therefore possible to:
    a. Follow the stream of fluid and gas through the stimulated reservoir volume
    b. Identify areas of smooth flow and inhibited flow
    c. Identify productivity of individual ports (by considering the curvature along stream lines)
    d. Identify drainage patterns of individual ports throughout the stimulated reservoir volume by underlying the streamlines with maps of a proxy for generated surface area/strength of shattering of the rock (e.g. seismic deformation, fracture complexity, enhanced fluid flow, and alignment with discrete fracture network) or Gas-In-Place/Oil-in-place parameters
13. Streamlines can be stopped if a given parameter reaches a cut-off value. This parameter is a proxy for flow strength
14. Curvature of the stream lines can be plotted as thickness of flow line to illustrate tortuosity of flow
15. Additionally, maps of the curvature of the strain field/crack orientation can be generated. Stream lines are for visual inspection, curvature maps show equally distributed interpretative value The above methodology will now be elaborated. FIG. 4 is a schematic illustration of a hydraulic fracturing monitoring system 100, according to an example embodiment, deployed to collect microseismic data caused by hydraulic fracturing from a stimulation well of a reservoir. The system shown in FIG. 4 is substantially similar to that described in above-referenced US Patent Publication No. 2012/0318550 (Urbancic et al.) and includes a plurality of seismic sensors 102, 104 measuring ground displacement or one of its derivatives (e.g., velocity or acceleration) deployed in the vicinity of the expected microseismic activity. The plurality of sensors 102, 104 are deployed throughout the vicinity of the expected microseismic activity, which can include deploying sensors 102 on ground level and/or deploying sensors 104 below ground level down one or more observation wells 106. Out of use stimulation wells can be used as observation wells if available. The seismic sensors 102, 104 can include, but are not limited to, geophones, accelerometers, or any other device that measures ground motion. For example, sensors 104 that are deployed in observation wells 106 may include three-component geophone arrays. The sensors 102, 104 are configured to record data corresponding to the three components of ground motion corresponding to the elastic waves generated by the microseismic activity (notably the Primary (P) and Secondary (S) waves).

The sensors 102, 104 are connected electrically to a computing device 108 such as a central processing unit (CPU), for example a Dell R300, operating in accordance with computer program instructions stored in memory, such that the electronic signals generated by the sensors can be captured on a local storage device (for example, persistent storage 113 associated with computing device 108), or transmitted for remote storage. The data collected by the plurality of sensors 102,104 can be digitized, for example with a digitizer 110 sold under the trademark Paladin by ESG Solutions Inc., of Kingston, Ontario, Canada, and time-stamped using a GPS synchronized time source 112 so that the data collected are precisely time-synchronized across all sensors 102, 104. The data collected by the digitizers 110 from the plurality of sensors 102, 104 can then be transmitted to a local data storage device 112 where the data from the plurality of sensors 102, 104 are combined in computer 108 to arrive at a time-synchronized record of the microseismic activity captured by the plurality of sensors 102, 104. Stimulation well 118 allows a micro seismic event to be generated at a stimulation zone 120.

The algorithms and data discussed herein, such as models, can be stored and processed locally on the memory, CPU and storage device of on-site computing device 108 previously mentioned, or alternatively, the collected seismic data can be transmitted or otherwise transported to a remote location, for example across a computer network 116 such as the Internet, for processing on a remote computer 114 having associated memory and storage device for the algorithms and data. The algorithms may be stored in memory in the form of computer programs which computer programs when operated on the computer cause the computer 108, 114 to carry out the algorithms using stored or received data, and storing the results of such algorithms following processing. A computer 108, 114 may have an associated monitor to allow an operator to view the data or graphical representations thereof and human interface devices such as a pointing device (for example, a mouse) and a keyboard for operator control, such as requests for particular graphical representations generated by the algorithms, and a display screen 118 for viewing of the data or graphical representations. It is recognized that the various functions of the computers 108, 114 mentioned in this description could be distributed across more than one computer 108, 114, and such distributed computers could interact locally or remotely, for example through a computer network such as the Internet.

It is further recognized that the algorithms described in this description can operate independent of the sensing system described in this description. The algorithms can be operated in a central location for a plurality of remote sensing systems. The algorithms can be used in real-time as data is collected provided that computers and communication networks of sufficient speed and capacity are available. Alternatively, sensed data can be stored for later use in conjunction with the algorithms.

In hydraulic fracturing, microseismic event locations provide detailed information on the paths of fluids during stimulation and thus the success of the fracture zone configuration. The geometry of the fractured zone (length, height, width, and azimuth) provides important constraints on the accessible hydrocarbons. As indicated above, in example embodiments, the Seismic Moment Tensor inversion (SMTI) is combined with information about the individual fracture orientation of microseismic events, which is then used to determine information about the fracture network.

Figure 5:
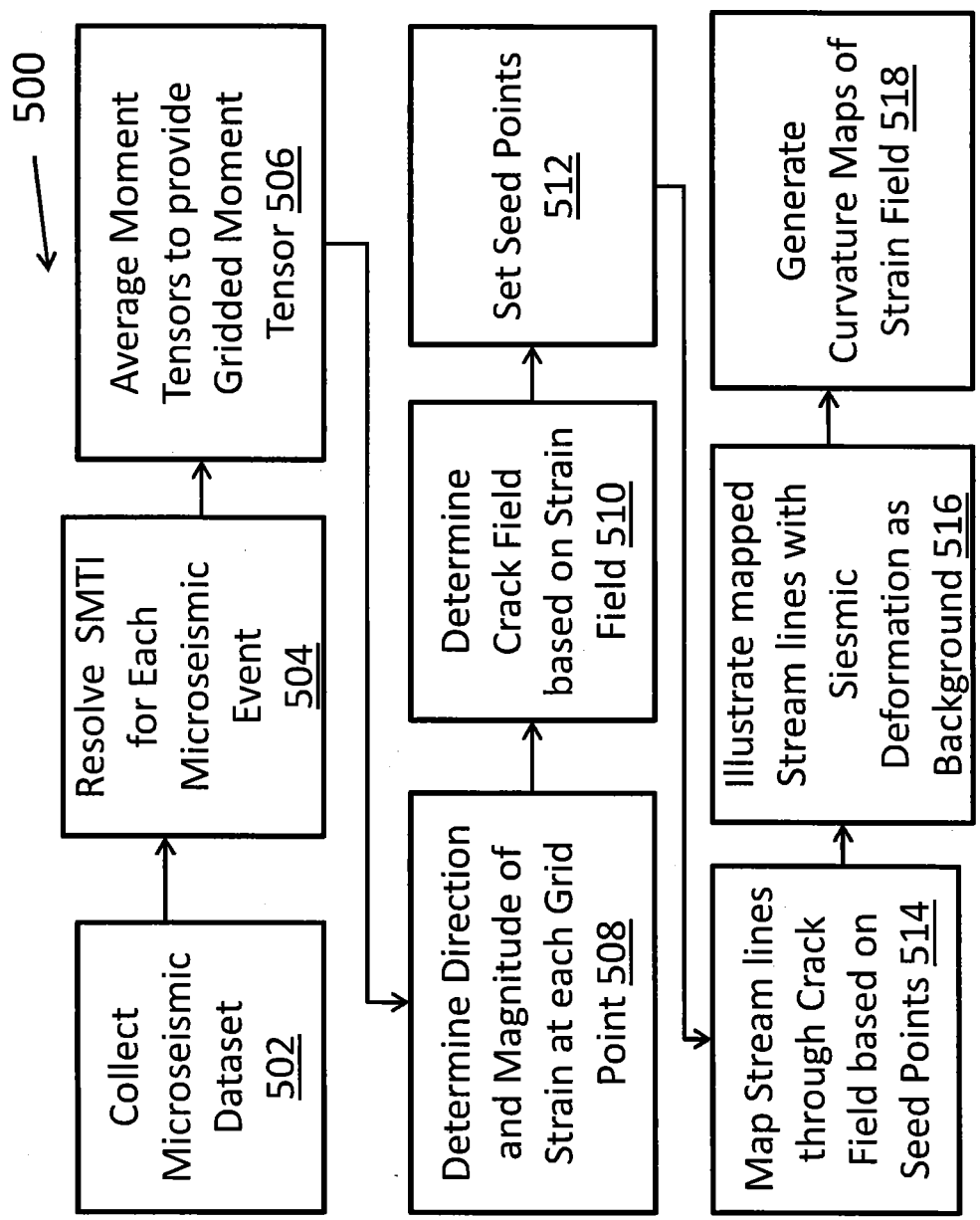
FIG. 5 is a flow chart illustrating a method of identifying reservoir drainage patterns from microseismic data, according to example embodiments.
Figure 6:
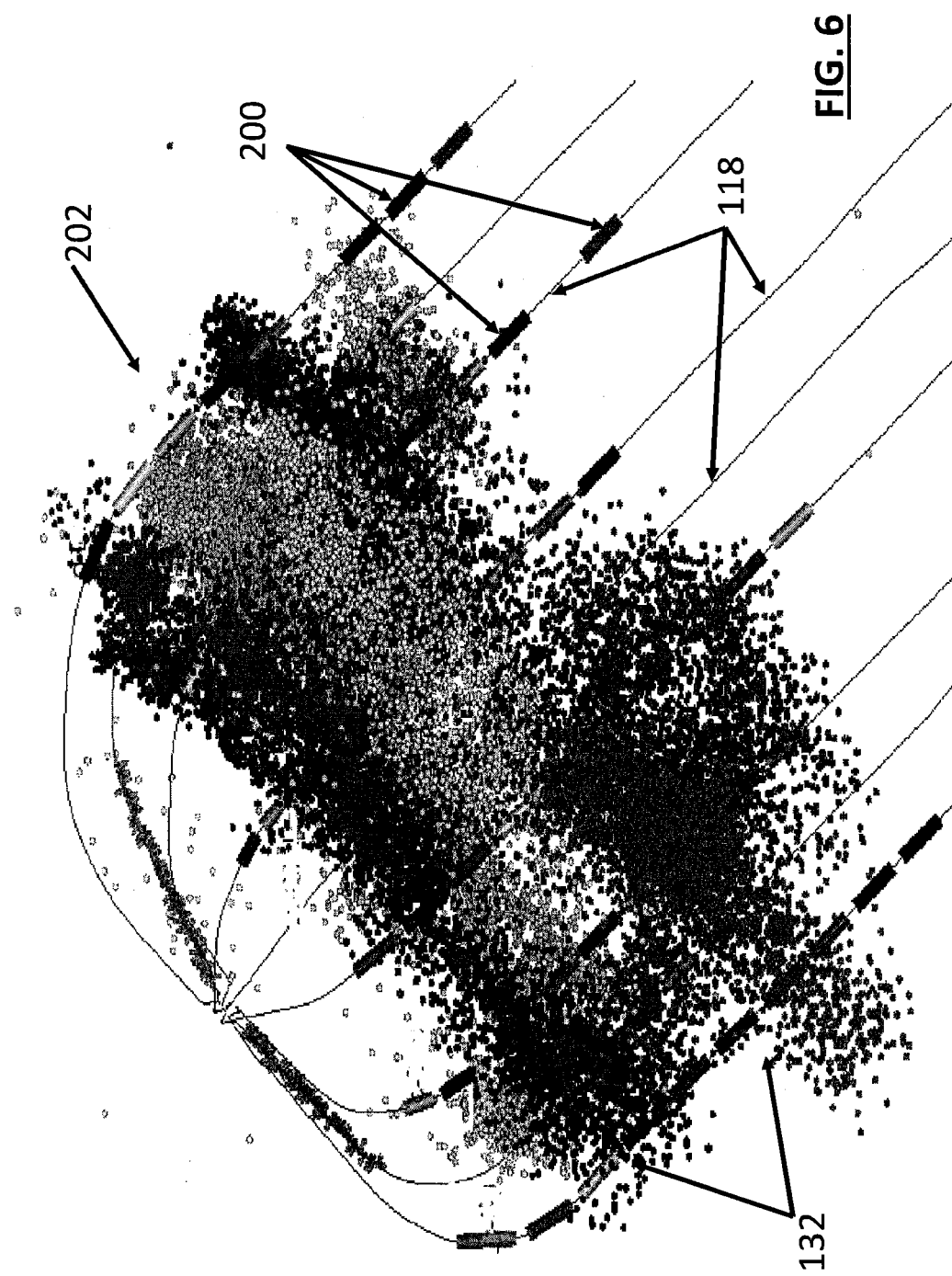
FIG. 6 illustrates an example of a microseismic dataset generated from the reservoir of FIG. 2.

In this regard, FIG. 5 illustrates a method 500 that can be implemented using the hydraulic fracturing monitoring system 100 of FIG. 4 and the process described above to determine information about the fracture network such as reservoir drainage patterns in the fracture zone. As indicated at step 502, data is collected for a plurality of microseismic events in a fracture zone, and as indicated at step 502, the SMTI is determined for each event. By way of example, FIG. 6 is a visual representation of the fracture zone 202 discussed above in respect of FIGS. 2 and 3 with approximately 33000 individual measured seismic events 132 illustrated as shaded dots that represent the location of the events in the fracture zone 202. Horizontal stimulation wells 118 are shown as lines and injection ports 200 are marked as thicker sections of the wells 118. In example embodiments, the SMTI is determined for each of the seismic events using the methodology described in above-referenced US Patent Publication No. 2012/0318550 (Urbancic et al.). Accordingly, in example embodiments the SMTI for each seismic event 132 includes parameters that define: (a) the magnitude or size of the event (known as the moment); (b) orientation corresponding to the pressure (P) and tension (T) axes and the intermediate (B) axis; and (c) source mechanism type (also referred to as the deformation style) that indicates if the event is one or a combination of an opening, closing or shear event.

The SMTI data for the events 132 that make up the microseismic dataset are then processed to identify the dominant flow pattern in the rock of the fracture zone 202. As part of the processing, as indicated at step 506, the fracture zone 202 is divided up into a grid and individual SMTI data for each of the events 132 is transferred to an average moment tensor for each point on the grid. In this respect, standard gridding algorithms such as nearest-neighbor or kriging are applied in example embodiments to provide a gridded Moment Tensor for the fracture zone 202.

As indicated at step 508, the gridded Moment Tensor is used to determine the dominant direction and magnitude of strain at each grid point to provide a strain field for the fracture zone 202. In one example embodiment, Eigen value analysis is applied to the average moment tensor for the grid points to resolve the orientation of the principle components of strain relative to the P-, T- and B-axis (which are the axis of most compressive orientation, least compressive orientation and intermediate orientation, respectively). FIG. 2 illustrates an example of a graphical representation of the resulting strain field in which, as noted above, the lengths of markers 204 correspond to the inclination of the dominant axis at each grid point, with vertical inclination represented by a dot. The stage ports 200 along the different wells are shown as gray bars.

Figure 8:
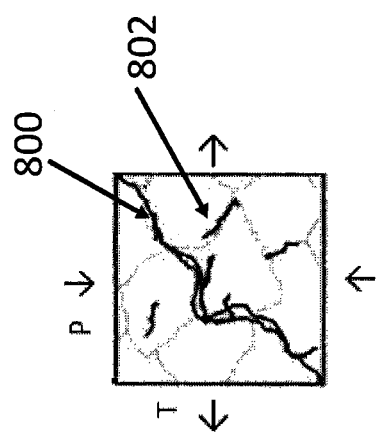
FIG. 8 is a conceptual illustration of dominant crack generation in the rock mass for a given strain field.
Figure 7:
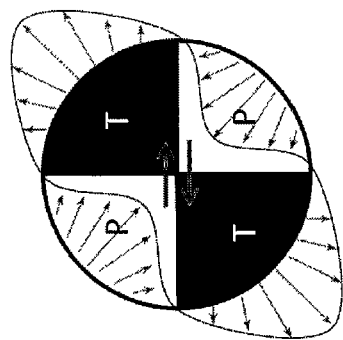
FIG. 7 is a simplified moment tensor represented as a beach-ball plot to illustrate particle motion for a shear failure and the P- and T-axes.

As indicated in step 510, a crack field is determined for the reservoir fracture zone 202 based on the strain field. A typical geomechanic response in fracturing is for cracks in the rock mass to develop preferentially oriented at +/−45 degrees between the strain P- and T-axes, resulting in preferred flow paths for the flow of reservoir fluid and gas. FIG. 7 is a simplified moment tensor represented as a beach-ball plot to illustrate particle motion for a shear failure and the P- and T-axes. In order to resolve ambiguity in the preferred orientation, crack orientation is determined to be the direction closest to a regional maximum stress orientation. In some embodiments, both orientations are determined. FIG. 8 is a conceptual illustration of dominant crack generation in the two orientations 800 and 802 in a rock mass for a given strain field.

Thus, in step 508, the strain field is inferred from the moment tensor data. In step 510, crack field data is inferred from the strain field, resulting in in-situ data from which constraints on flow of natural can or other hydrocarbon fluids through the fracture zone can be inferred. In steps 512 and 514, stream lines for the fracture zone are determined to allow the flow through the reservoir fracture zone to be visualized. As previously indicated, the stream lines are representations of the trajectories of particles in a steady flow, which are (a) tangent to the vector of the flow and; (b) perpendicular to equipotential lines (corresponding to the strength of the flow). The vector of the flow can be inferred from the crack field data.

As indicated in step 512, an initial step in determining the stream lines includes setting seed points for the stream lines. In one example embodiment, the perforation center of each of the fracture or stage ports 200 is used as a seed point with propagation being inferred in both directions, however different arbitrary locations can be chosen as seed points to address different objectives.

As indicated in step 514, stream lines are mapped through the crack field in propagating in both directions outward from the seed points. The direction of the stream lines between seed points is determined based on the crack field data. In particular, the gridded fracture values are interpolated between seed points to create stream lines. The complexity of the stream lines is representative of the predicted flow strength through the stream lines—straight simple streamlines allows for stronger flow to occur where more convoluted complex streamlines result in a reduction of flow and hence flow strength. The streamline complexity is referred to as tortuosity, which can be considered as a flow strength parameterization. In example embodiments, stream line complexity can be compared against predetermined values to estimate a stream line flow strength that can then be represented graphically as a thickness of the stream line. In some examples, the calculated stream lines can compared against predetermined models and used as a predictive indicator of when production flow would decrease (for example, when production would fall below an economic threshold value) thereby precipitating the need for additional stimulation for the well.

Figure 2C:
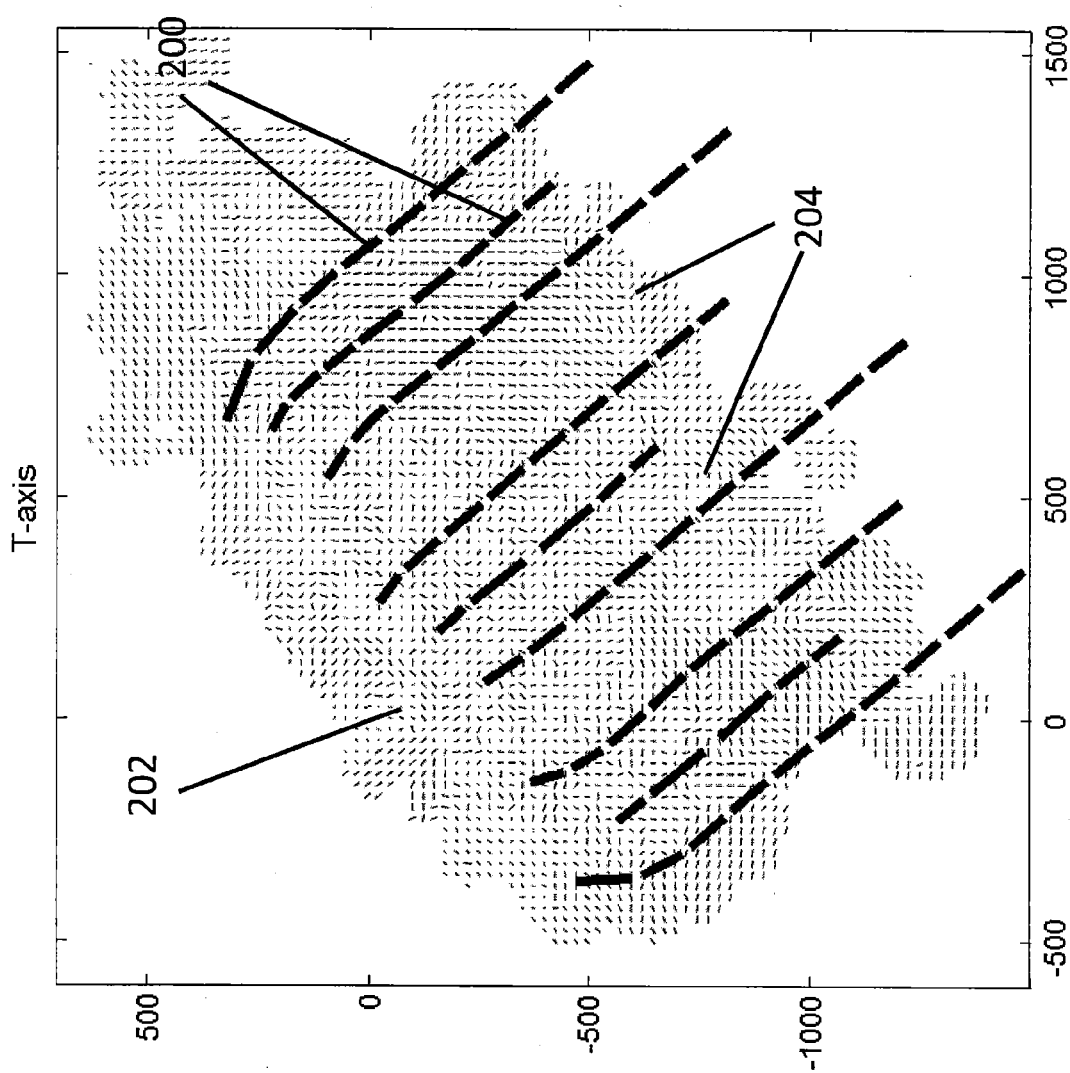
Figure 9:
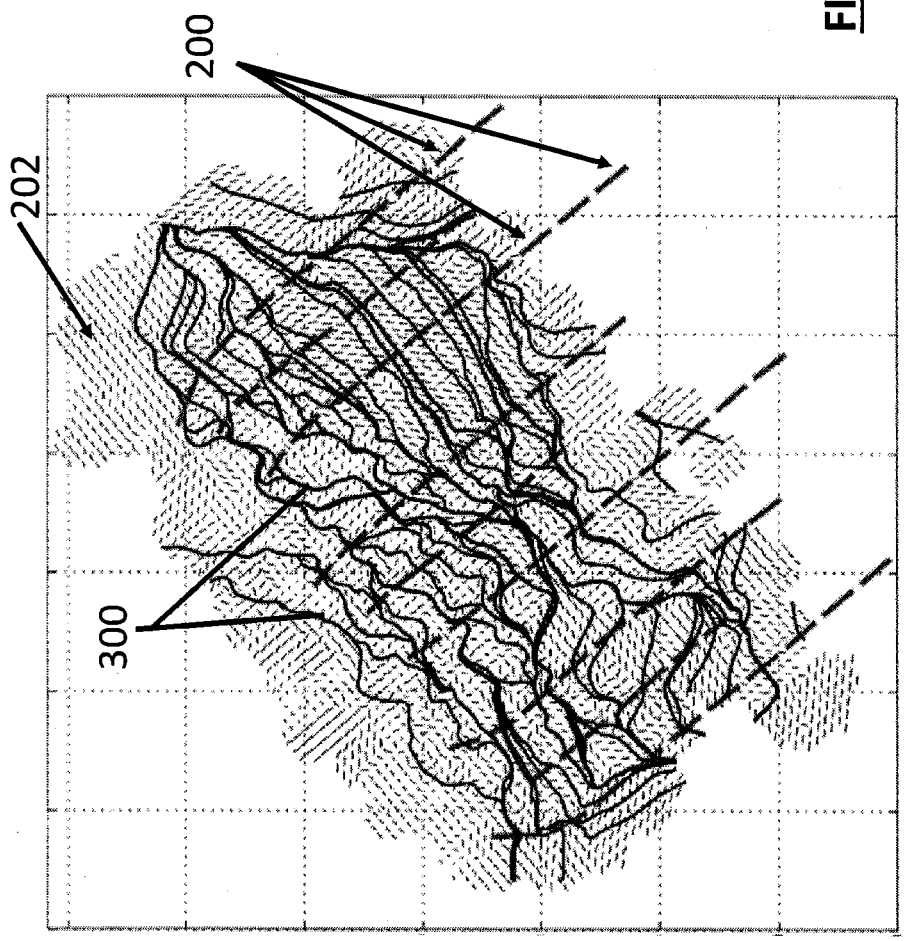
FIG. 9 shows calculated stream lines overlain on the strain field diagram of FIG. 2.

In this regard, FIG. 9 illustrates a graphical representation of the calculated stream lines 300 overlaid on the strain field map of FIG. 2(c).

As noted above, mapping stream lines 300 through the crack field (as inferred from the strain field) can in at least some applications act as predictive indicators that make it possible to: (a) follow the stream of fluid and gas through the fracture zone 202 of the stimulated reservoir volume; (b) identify areas of smooth flow and inhibited flow; (c) identify productivity of individual ports 200 (by considering the curvature along stream lines); (d) identify drainage patterns of individual ports 200 throughout the stimulated reservoir volume by underlying the streamlines with maps of a proxy for generated surface area/strength of shattering of the rock (e.g. seismic deformation) or Gas-In-Place/Oil-in-place parameters.

Figure 10:
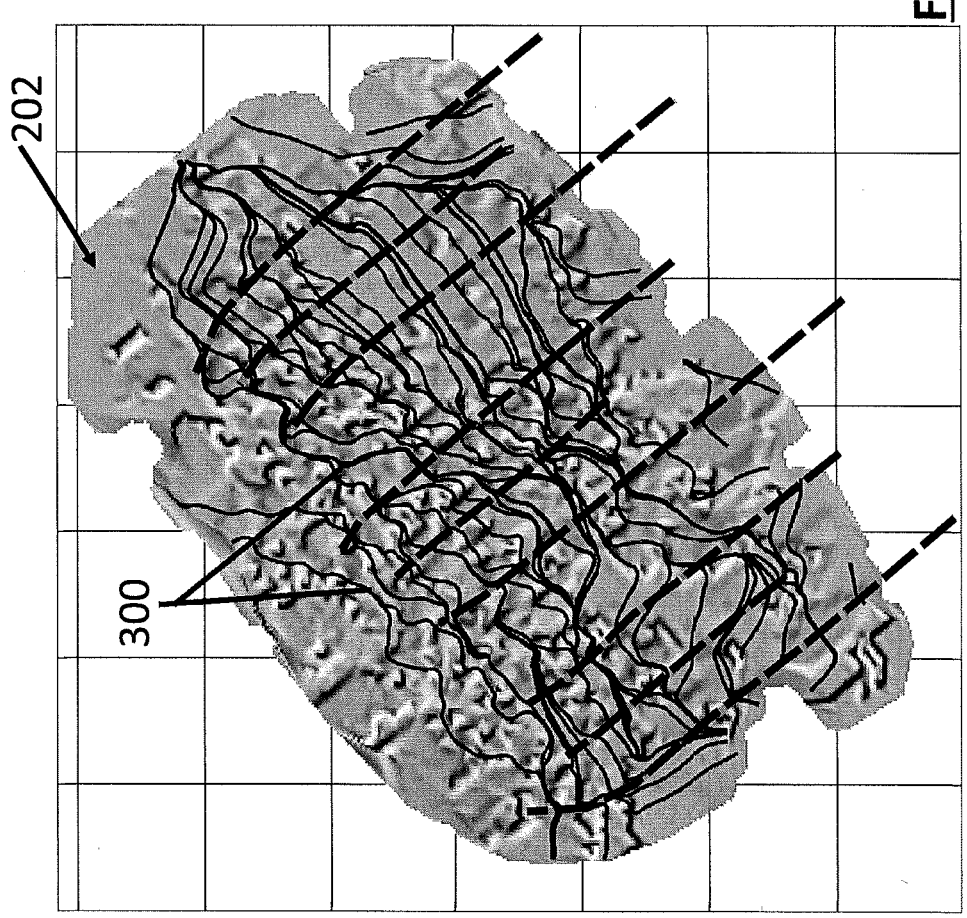
FIG. 10 shows a representation of the calculated stream lines overlaid on a flexture or curvature illustration of the strain field.

In addition to calculating and illustrating stream lines 300 on a stress field map as shown in FIG. 9, as indicated in step 516, the stream lines 300 can also be mapped overlaid on seismic deformation information for the reservoir fracture zone 202. Such an illustration is shown in FIG. 3. In some examples, curvature of the stream lines 300 can be represented by the thickness of stream line plot. As indicated in step 518, in some examples, the stream lines 300 can also be mapped overlaid on a map of the curvature of the strain field or crack field, with the curvature map providing interpretive value to the visualized stream lines. In this regard, FIG. 10 illustrates an example of stream lines 300 overlaid on a curvature map of the fracture zone 202.

Graphical illustrations of the types shown in the Figures can be generated on a computing device (for example device 114) and presented on visual output device such as a display terminal or a projected display or provided on a printed plot. The calculations used to generate the stream line data can be performed on computing device such as device 113 or 114 and stored for future use and presentation. In some examples, the microseismic event data set used to generate the stream line data may be continually updated (for example during a fracturing process), and that data used to provide real-time or near real time generation of stream line data, thus providing feedback of predicted drainage and flow patterns while fracturing is ongoing.

REFERENCES

The contents of the following documents are incorporated herein by reference:

Baig, A. M., and Urbancic, T. I., 2010, Microseismic moment tensors: A path to understanding frac growth, The Leading Edge. 29(3), 320-324

Fisher, M. K., Wright, C. A., Davidson, B. M., Goodwin, A. K., Fielder, E. O., Buckler, W. S., and Steinsberger, N. P., 2002, Integrating Fracture Mapping Technologies to Optimize Stimulations in the Barnett Shale, SPE Convention San Antonio, SPE 77441

Nicholson, T, Sambridge, M. and Gudmondsson, O, 2000, On entropy and clustering in earthquake hypocentre distributions, Geophys. J. Int., 142, 37-51.

Urbancic, T. I., Trifu, C. I. and Shumila, V., 1997, Investigating the extent of excavation influence using deformation state analysis, in: Rockbursts and Seismicity in Mines, S. J. Gibowicz (ed), A. A. Balkema, Rotterdam, Netherlands, 1997.

While example embodiments have been shown and described herein, it will be obvious that each such embodiments are provided by way of example only. Numerous variations, changes, and substitutions will occur to those skilled in the art without departing from the invention disclosed.

What is claimed is:

1. A method for identifying flow patterns in a reservoir from microseismic event data comprising:

introducing a fracturing fluid into a stimulation zone of the reservoir;

measuring, using seismic sensors at a plurality of spatially separated locations in the reservoir, seismic data resulting from the introduction of the fracturing fluid;

providing the seismic data to a processing system;

determining, using the processor system and in dependence on the seismic data, moment tensor data for each of a plurality of microseismic events in the reservoir resulting from the introduction of the fracturing fluid;

inferring, using the processor system, strain field data for the reservoir in dependence on the moment tensor data, the strain field data representing a dominant direction of strain orientations of pressure (P-) axis strain and tension (T-) axis strain at each of a plurality of grid points within the reservoir;

inferring, using the processor system, crack field data for the reservoir in dependence on the strain field data, the crack field data representing orientations of cracks formed at the grid points in the reservoir from the microseismic events, the cracks each being assigned an orientation of plus or minus 45 degrees between the P-axis strain orientation which is related to an inhibition of fluid flow and the T-axis strain orientation; and mapping, using the processor system and in dependence on the inferred crack field data and the P-axis strain orientation which is related to the inhibition of fluid flow, stream lines through the reservoir propagating outward from seed points, the stream lines representing preferential fluid flow pathways through the reservoir.

2. The method of claim 1 wherein determining moment tensor data comprises resolving a magnitude, a stress orientation and a source mechanism type for each seismic event in dependence on sensor data collected for the reservoir in response to the fracturing fluid introduced into the reservoir.

3. The method of claim 2 wherein the plurality of grid points are determined by dividing the reservoir into a grid, and inferring strain field data comprises, for each of the grid points: selecting a set of the microseismic events using a nearest neighbor search and averaging the moment tensor data for the selected set of seismic events to determine a magnitude and the orientations of pressure (P-) axis strain and tension (T-) axis strain at the grid point that is an aggregate of the selected set of seismic events.

4. The method of claim 1 wherein the seed points coincide with perforation ports used to introduce fracturing fluid to the reservoir.

5. The method of claim 1 wherein mapping comprises outputting a graphical representation of the stream lines on a map of the reservoir.

6. The method of claim 5 wherein the stream lines are overlaid on seismic deformation information for the reservoir, the seismic deformation information comprising at least one of moment magnitude information, source area information, seismic moment per unit volume information, drainage potential information.

7. The method of claim 5 wherein the stream lines are overlaid on strain or crack formation information for the reservoir.

8. The method of claim 5 wherein the stream lines are overlaid on curvature maps illustrating strain information for the reservoir.

9. The method of claim 5 comprising collecting information for ongoing microseismic events in the reservoir and updating the graphical representation of the stream lines in dependence on the information.

10. The method of claim 5 wherein the stream lines are overlaid on a strain field map.

11. The method of claim 1 comprising, when assigning an orientation for a crack of plus or minus 45 degrees between the P-axis strain orientation and the T-axis strain orientation, assigning the orientation based on a direction closest to a regional maximum stress orientation when the strain field data indicates an ambiguity in orientation exists.

12. The method of claim 1 comprising predicting a strength of fluid flow through the reservoir in dependence on a complexity of the mapped stream lines.

13. The method of claim 1 wherein mapping stream lines through the reservoir propagating outward from seed points comprises interpolating the crack orientations at the grid points between seed points.

14. The method of claim 13 wherein fracturing fluid is introduced at a plurality of stage ports throughout the stimulation zone, and locations of the stage ports are used as the seed points.

15. A system for identifying flow patterns in a reservoir containing hydrocarbon fluids, comprising:
- a plurality of spatially separated seismic sensors deployed throughout the reservoir for measuring microseismic event information for a plurality of microseismic events in the reservoir in response to the introduction of fracturing fluid to the reservoir;
- a data collection system for collecting and combining the measured microseismic event information from the plurality of seismic sensors to provide a dataset of microseismic event information for a plurality of microseismic events in the reservoir, the microseismic event information being dependent on measurements made by sensors in the reservoir in response to the introduction of fracturing fluids to the reservoir;
- a graphical output device; and
- a processor system enabled to:
  determine moment tensor data for each of a plurality of the microseismic events in the reservoir in dependence on the microseismic event information;
  infer strain field data for the reservoir in dependence on the moment tensor data, the strain field data representing orientations of pressure (P-) axis strain and tension (T-) axis strain at each of a plurality of grid points within the reservoir;
  infer crack field data for the reservoir in dependence on the strain field data, the crack field data representing orientations of cracks formed at the grid points in the reservoir from the microseismic events, the cracks each being assigned an orientation of plus or minus 45 degrees between the P-axis strain orientation which is related to an inhibition of fluid flow and the T-axis strain orientation; and
  map, in dependence on the inferred crack field data and the P-axis strain orientation which is related to the inhibition of fluid flow, stream lines propagating outward from seed points within the reservoir, the seed lines representing preferential fluid flow pathways through the reservoir; and
  output a graphical representation of the stream lines on the graphical output device.

16. The system of claim 15 wherein the processor system is enabled to determine moment tensor data by resolving a magnitude, a stress orientation and a source mechanism type for each of the plurality of seismic events in dependence on the microseismic event information.

17. The system of claim 16 wherein the plurality of grid points are determined by dividing the reservoir into a grid, and the processor system is enabled to infer strain field data by, for each of the grid points: selecting a set of the microseismic events using a nearest neighbor search and averaging the moment tensor data for the selected set of seismic events to determine a magnitude and the orientations of pressure (P-) axis strain and tension (T-) axis strain at the grid point that is an aggregate of the selected set of seismic events.

18. The system of claim 17 wherein the seed points coincide with perforation ports used to introduce fracturing fluid to the reservoir.

19. The system of claim 15 the graphical representation of the stream lines on the graphical output device includes one or more of: the stream lines overlaid on seismic deformation information for the reservoir; the stream lines overlaid on strain or crack formation information for the reservoir; and the stream lines overlaid on curvature maps illustrating strain information for the reservoir.

20. The system of claim 15 wherein the processor system is enabled to receive information for ongoing microseismic events in the reservoir and update the graphical representation of the stream lines in dependence on the information.

* * * * *